June 19, 1928.  1,674,399
J. M. KIRKPATRICK
GOLD OR MINERAL TRAP
Filed June 10, 1926  2 Sheets-Sheet 1

INVENTOR
John M. Kirkpatrick
By W. W. Williamson Atty.

June 19, 1928.
J. M. KIRKPATRICK
GOLD OR MINERAL TRAP
Filed June 10, 1926
1,674,399
2 Sheets-Sheet 2
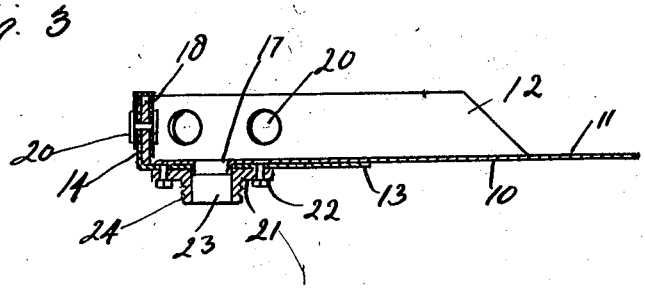
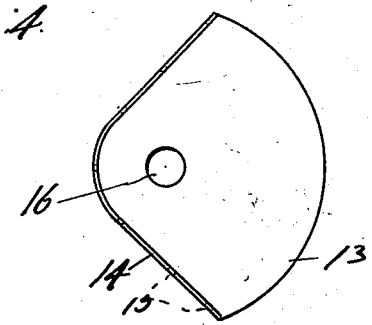
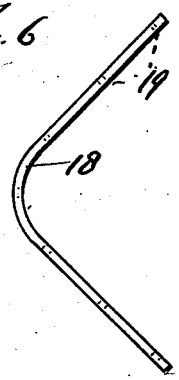
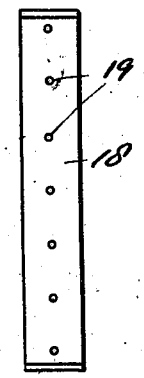
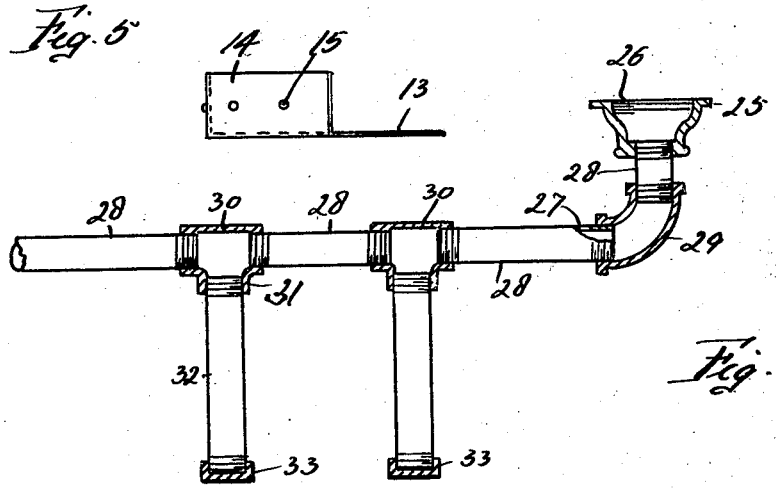
INVENTOR
John M. Kirkpatrick
By W. W. Williamson Atty.

Patented June 19, 1928.

1,674,399

UNITED STATES PATENT OFFICE.

JOHN M. KIRKPATRICK, OF HUNTINGDON VALLEY, PENNSYLVANIA.

GOLD OR MINERAL TRAP.

Application filed June 10, 1926. Serial No. 114,925.

My invention relates to new and useful improvements in a gold or mineral trap, and has for its primary object the provision of means to catch minerals being washed along the bed of a stream by the flow of water, and to guide the mineral with sand or other material in the stream through a conduit having connection with depending traps into which the mineral will descend, while the sand and other material passes on through the conduit and returns to the bed of the stream.

Another object of the invention is to provide a gold or mineral trap including a tray formed from sheet lead so that its weight will assist in holding it on the stream bed, and the flexibility thereof will permit bending thereof so that it may be adjusted to the irregularities of the stream bed.

A further object of the invention is to provide a unique arrangement for stiffening the tray and for connecting a coupling element therewith.

A still further object of the invention is to provide a gold or mineral trap including a tray having an outlet to which is connected a conduit made up of a plurality of sections of pipe, certain sections of which are in the form of T couplings for connection with other sections of pipe forming the traps proper, the lower ends of which are closed by screw threaded caps.

With these and other ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:

Fig. 3, is an enlarged sectional view of the tray along the line 3—3 of Fig. 2.

Fig. 4, is a plan view of one of the stiffening members.

Fig. 5, is a side elevation thereof.

Fig. 6, is an edge view of another stiffening member.

Fig. 7, is a face view thereof.

Fig. 8, is an enlarged sectional view of the conduit and its component parts.

Figure 1:
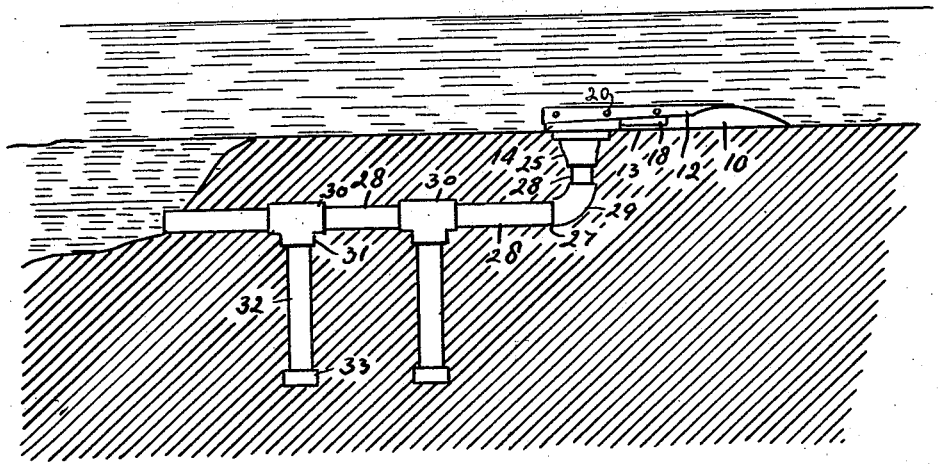
Fig. 1, is a sectional view of the bed of the stream showing my gold or mineral trap set therein.
Figure 2:
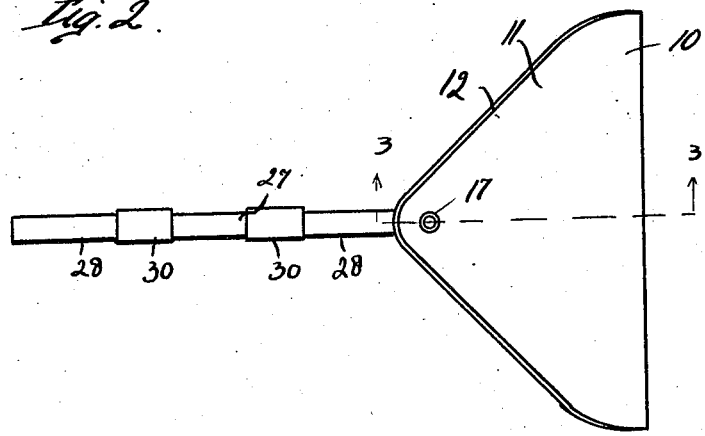
Fig. 2, is a plan view of the trap.

In carrying out my invention as herein embodied, I employ a sheet of lead of suitable size and configuration, and so fashioned as to provide a tray 10, comprising a bottom 11 and an upstanding flange 12, and where the tray is made of generally triangular shape as shown in Fig. 2, said flange extends along only two of the sides, leaving the third side open, for use as an entrance or mouth to the tray.

Underneath the rear portion of the tray is fitted a stiffening plate 13, which is of the same general shape as the tray and is provided with an upstanding flange 14 having holes 15 therethrough, and this stiffening member or plate may be of steel or other suitable plastically inflexible material. The stiffening plate is also provided with an outlet 16 which registers with an outlet 17 in the tray, and in forming the tray outlet, the lead may be turned down or swaged over the edge of the outlet 16, as may be plainly seen by reference to Fig. 3. The flange 14 of the stiffening plate parallels the flange of the tray, but is spaced therefrom, and within this space is placed the stiffening strip 18 bent to the contour of the flanges of the other parts, and said strip is provided with a plurality of holes 19, some of which will register with the holes 15, but the endmost ones extend beyond the flanges 14 of the stiffening plate. The flange of the tray is bent over the upper edges of the stiffening plate flange, and the stiffening strip, and then carried down in back of the stiffening plate flange, as shown in Fig. 3, after which all of the parts are secured together by suitable fastening means 20, which pass through the holes 15 and 19 and through the overlapping parts of the tray flange, and said fastening means should have large heads, such as bigheaded rivets.

On the under side of the tray is secured a flanged nipple 21 by means of fastening devices 22, and said nipple is provided with a bore 23, and may be exteriorly threaded, as at 24. This nipple is adapted to register with the socket 25, which may be interiorly threaded, as at 26, for threaded connection with the nipple when the latter is provided with a thread. The socket 25 forms the entrance end of a conduit 27, preferably made up of a number of lengths of pipe, 28, elbow 29 and one or more T couplings 30, and said conduit is open at both ends. The T couplings are arranged so that an arm 31 of each depends from the conduit for the reception of a depending tubular trap 32, which may be a section of pipe, the lower end of which is closed by a cap 33, preferably having threaded connection therewith.

From the foregoing description it will be evident that a simple and inexpensive gold or mineral trap is provided by the structure set forth, and the tray being of lead with its mouth, entrance or open end being free of any stiffening element is capable of being bent to conform with the contour of the stream bed, particularly where large rocks form portions thereof, or the edge of the mouth may be bent down, and embedded in the sand of the stream bed, so that the mineral bearing sands or materials passing down the streams will have to flow into the tray rather than under it.

In practice, any number of these gold or mineral traps might be set in a stream, and as the mineral bearing material washes into the tray, the heavier portion thereof will tend to stay within the tray, while the lighter material will pass over the flanges, said heavier portion that remains within the tray will be guided by the flanges toward the outlet 17, and will then flow into the conduit, and during its passage through said conduit, the heavy minerals will lie along the bottom thereof and fall into the tubular traps 32, while the sand and other foreign material will pass on through the conduit back to the stream. At intervals, the tubular traps 32 may be removed without disturbing the entire trap to any great extent, or the entire trap may be removed, and the tubular traps then detached and the contents removed.

A gold or mineral trap of this character may be used for gathering minerals from flowing streams, but is particularly valuable for use by a prospector for by placing a number of these traps in a stream or setting one at different places at different times, it will enable him to locate the region from which the mineral is dislodged.

Of course I do not wish to be limited to the exact details of construction as herein shown as these may be be varied within the limits of the appended claims without departing from the spirit of my invention.

Having thus fully described my invention, what I claim as new and useful is:

A mineral trap consisting of a yieldable tray including a bottom and an up-standing flange, and a stiffening means comprising a bottom and an up-standing flange, said stiffening means being secured to the under side of the rear portion of the tray and to the outer face of the tray flange, the forward edge of the stiffening means terminating short of the forward edge of the tray, whereby the latter is free for distortion.

In testimony whereof, I have hereunto affixed my signature.

JOHN M. KIRKPATRICK.